United States Patent
Greenblatt

(10) Patent No.: US 11,920,575 B2
(45) Date of Patent: *Mar. 5, 2024

(54) BICYCLE TIRE PUMP

(71) Applicant: Everlast Climbing Industries, Inc., Fridley, MN (US)

(72) Inventor: Joel Greenblatt, Golden Valley, MN (US)

(73) Assignee: Everlast Climbing Industries, Inc., Fridley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/894,458

(22) Filed: Aug. 24, 2022

(65) Prior Publication Data

US 2022/0403833 A1 Dec. 22, 2022

Related U.S. Application Data

(63) Continuation of application No. 16/413,878, filed on May 16, 2019, now Pat. No. 11,460,017.

(51) Int. Cl.
*F04B 33/00* (2006.01)
*B62H 3/04* (2006.01)
*F04B 39/12* (2006.01)

(52) U.S. Cl.
CPC .......... *F04B 33/005* (2013.01); *B62H 3/04* (2013.01); *F04B 39/121* (2013.01)

(58) Field of Classification Search
CPC ........ F04B 41/00; F04B 33/00; F04B 39/127; F04B 33/005; B62H 3/04
See application file for complete search history.

(56) References Cited

U.S. PATENT DOCUMENTS

| | | |
|---|---|---|
| 617,954 A | 1/1899 | Chase |
| 1,253,976 A | 1/1918 | Hughes |
| 1,386,567 A | 8/1921 | Hafstrom |
| 1,414,463 A | 5/1922 | Grant |
| 1,476,600 A | 12/1923 | Dickens |

(Continued)

FOREIGN PATENT DOCUMENTS

FR 2981039 A1 4/2013

OTHER PUBLICATIONS

Pages from http://www.bikefixtation.com/, 9 sheets, printed on Sep. 15, 2014.

(Continued)

*Primary Examiner* — Philip E Stimpert
(74) *Attorney, Agent, or Firm* — McAndrews, Held & Malloy, Ltd.

(57) ABSTRACT

A pump for inflating tires with air is provided. The pump includes a body having a base and a top portion and a cutout configured to receive a tire of a bicycle. The base is configured to be anchored to the ground. The pump includes a handle assembly including a piston rod and a handle bar. The pump includes a tube positioned in the body and secured to at least one plate in the body. The tube slidably receives the piston rod and is connected to an air line. The pump includes a hose connected to the air line and extending from the body. The hose has a head configured to engage a nozzle of the tire. When the piston rod is moved downward within the tube, air is displaced from the tube and through the air line to the hose such that the head dispenses air.

20 Claims, 13 Drawing Sheets

(56) References Cited

U.S. PATENT DOCUMENTS

| | | | |
|---|---|---|---|
| 1,501,546 A | 7/1924 | Shaw | |
| 2,697,842 A | 12/1954 | Meyer | |
| 2,723,794 A | 11/1955 | Russell | |
| 3,064,964 A | 11/1962 | Carlson | |
| 3,907,461 A | 9/1975 | Bouder | |
| 4,200,233 A | 4/1980 | Mitchell | |
| 4,470,870 A | 9/1984 | Driscoll et al. | |
| 7,367,366 B2 | 5/2008 | Liao | |
| 7,469,591 B1 | 12/2008 | Chuang | |
| 9,765,766 B2 | 9/2017 | Kennedy Lageson et al. | |
| 9,863,409 B2 | 1/2018 | DeBaker | |
| 10,330,092 B2 | 6/2019 | Kennedy Lageson et al. | |
| 11,199,185 B2 | 12/2021 | Kennedy Lageson et al. | |
| 2003/0026706 A1 | 2/2003 | Wu | |
| 2004/0191098 A1 | 9/2004 | Wu | |
| 2004/0258534 A1 | 12/2004 | Patel | |
| 2008/0050255 A1 | 2/2008 | Chuang | |
| 2009/0060766 A1 | 3/2009 | Hawkins et al. | |
| 2010/0180957 A1 | 7/2010 | Wu | |
| 2016/0076527 A1* | 3/2016 | Kennedy Lageson | F04B 33/005 417/63 |
| 2016/0167725 A1* | 6/2016 | Kritzer | B60B 7/00 211/5 |
| 2016/0297063 A1* | 10/2016 | Chuang | B25H 1/0014 |
| 2017/0350378 A1 | 12/2017 | Kennedy Lageson et al. | |
| 2018/0202565 A1 | 7/2018 | Wang | |

OTHER PUBLICATIONS

Dero Air Kit A Brochure. 3 sheets. Believed to be publicly available no later than Sep. 2012.
Dero Air Kit B Brochure. 3 sheets. Believed to be publicly available no later than Sep. 2012.
USPTO Office Action dated Feb. 17, 2021, U.S. Appl. No. 16/404,403, 19 pages.
USPTO Office Action dated Sep. 6, 2023, U.S. Appl. No. 17/547,699, 41 pages.
USPTO, Final Office Action dated Dec. 1, 2023, U.S. Appl. No. 27/547,699 (38 pages).

* cited by examiner

BICYCLE TIRE PUMP

RELATED APPLICATIONS

This application is a Continuation of U.S. patent application Ser. No. 16/413,878, filed on May 16, 2019, which is incorporated herein by reference and made a part hereof.

TECHNICAL FIELD

Embodiments of the present technology generally relate to air pumps, and, more particularly, to air pumps for inflating bicycle tires.

BACKGROUND

In order for a bicycle to operate effectively, the air pressure in the tires of the bicycle should be maintained at a certain level. Over time and over the course of use, bicycle tires leak air such that the air pressure in the tire decreases to an undesirable level. Therefore, bicycle users frequently need to refill the air in the tires of their bicycles with an air pump. While many bicyclists have their own portable bike pump which they keep at home or take with them on rides, "public" bicycle pumps exist that are configured to be secured to the ground outdoors along bike paths or at parks, bike stations, or shops so that many different bicyclists can use the pump.

Conventional bicycle pumps typically are lightweight and not made of particularly robust materials. Therefore, bicycle pumps, especially public pumps mounted outdoors, can wear out and break quickly from use and the elements. Moreover, many of the parts of a conventional bicycle pump are integrally formed together as a single piece, and, therefore, it is not easy to disassemble the bike pump or remove or replace individual parts of the bike pump. In addition, it can be cumbersome to keep a bicycle balanced while filling its tires with air with a pump.

SUMMARY

Certain embodiments of the present technology provide a pump for inflating tires with air. The pump includes a body having a base and a cutout configured to receive a tire of a bicycle. The base is configured to be anchored to the ground. The pump includes a handle assembly including a piston rod and a handle bar. The pump includes a tube positioned in the body and secured to at least one plate in the body. The tube slidably receives the piston rod and is connected to an air line. The pump includes a hose connected to the air line and extending from the body. The hose has a head configured to engage a nozzle of the tire. When the piston rod is moved downward within the tube, air is displaced from the tube and through the air line to the hose such that the head dispenses air.

The pump may include a top portion that is detachably connected by a fastener to a tab located in the body. The tab may be a part of a ring connected to an interior surface of the body. The tube may be secured to an upper plate and a lower plate in the body. The tube may include first and second annular grooves, wherein the first annular groove receives a portion of the upper plate and the second annular groove receives a portion of the lower plate. The pump may include at least one plate connected to the body inside the cutout. The pump may include a protective plate on an exterior of the body configured to engage the nozzle head. The pump may include a pressure gauge mounted to the body. The cutout of the pump may extend through the base.

The air line of the pump may include a first air line that is connected at a first end to a first fitting extending from the tube and that is connected at a second end to a check valve, a second air line that is connected at a first end to the check valve and that is connected at a second end to a splitter, a third air line that is connected at a first end to the splitter and that is connected at a second end to a second fitting connected to the pressure gauge, and a fourth air line that is connected at a first end to the splitter and that is connected at a second end to a third fitting connected to the hose.

Certain embodiments of the present technology provide a pump for inflating tires with air. The pump includes a body having a base and a top portion and a cutout configured to receive a tire of a bicycle. The base is configured to be anchored to the ground and the top portion is detachably connected by a fastener to a tab positioned in the body. The pump includes a handle assembly including a piston rod and a handle bar. The pump includes a tube positioned in the body and secured to an upper plate and a lower plate in the body. The tube slidably receives the piston rod and is connected to an air line. The pump includes a hose connected to the air line and extending from the body. The hose has a head configured to engage a nozzle of the tire. When the piston rod is moved downward within the tube, air is displaced from the tube and through the air line to the hose such that the head dispenses air.

The tab of the pump may be part of a ring connected to an interior surface of the body. The tube of the pump may include first and second annular grooves, wherein the first annular groove receives a portion of the upper plate and the second annular groove receives a portion of the lower plate. The pump may include at least one plate connected to the body inside the cutout. The pump may include a protective plate on an exterior of the body configured to engage the nozzle head. The cutout of the pump may extend through the base. The pump may include a pressure gauge mounted to the body.

The air line of the pump may include a first air line that is connected at a first end to a first fitting extending from the tube and that is connected at a second end to a check valve, a second air line that is connected at a first end to the check valve and that is connected at a second end to a splitter, a third air line that is connected at a first end to the splitter and that is connected at a second end to a second fitting connected to the pressure gauge, and a fourth air line that is connected at a first end to the splitter and that is connected at a second end to a third fitting connected to the hose.

The hose of the pump may be made of threaded metal. The piston rod of the pump may include a piston head on which is mounted two flexible gaskets that each form a seal with an interior wall of the tube.

Figure 1:
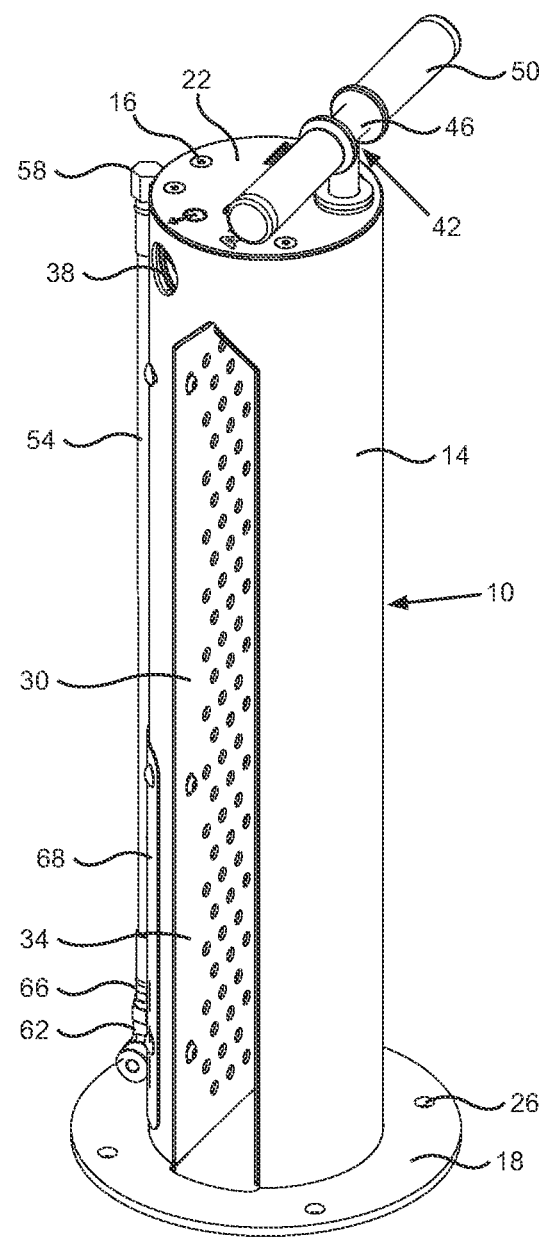
FIG. 1 illustrates an isometric view of a pump according to an embodiment of the present technology.
Figure 2:
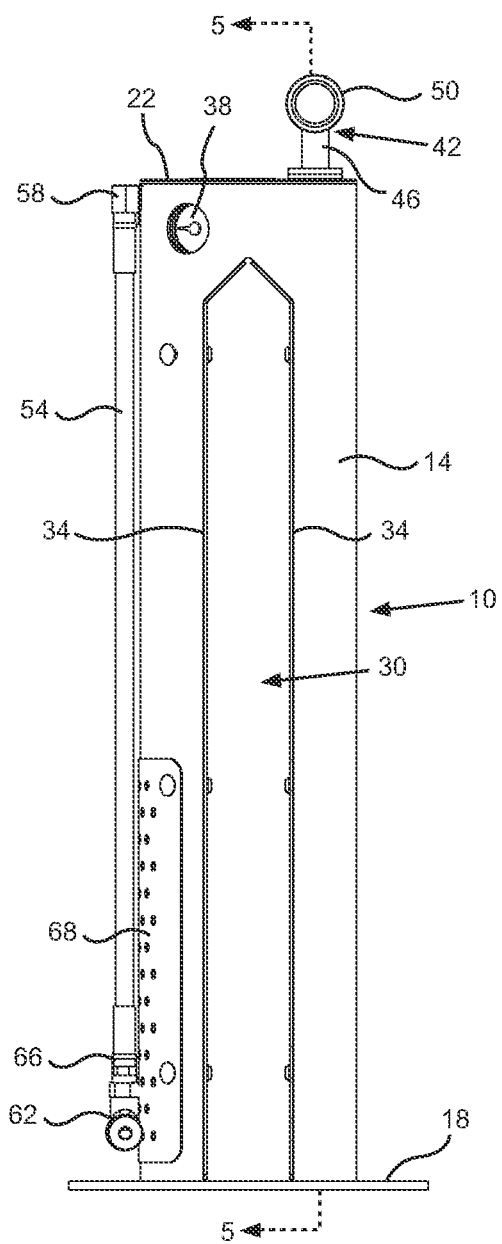
FIG. 2 illustrates a front view of the pump of FIG. 1.
Figure 3:
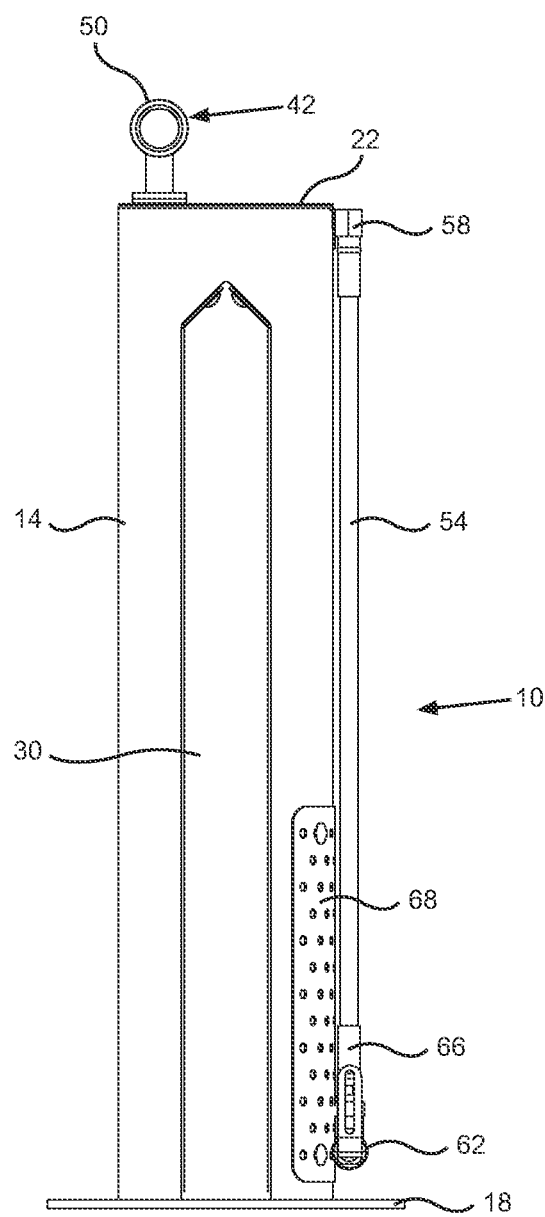
FIG. 3 illustrates a rear view of the pump of FIG. 1.
Figure 4:
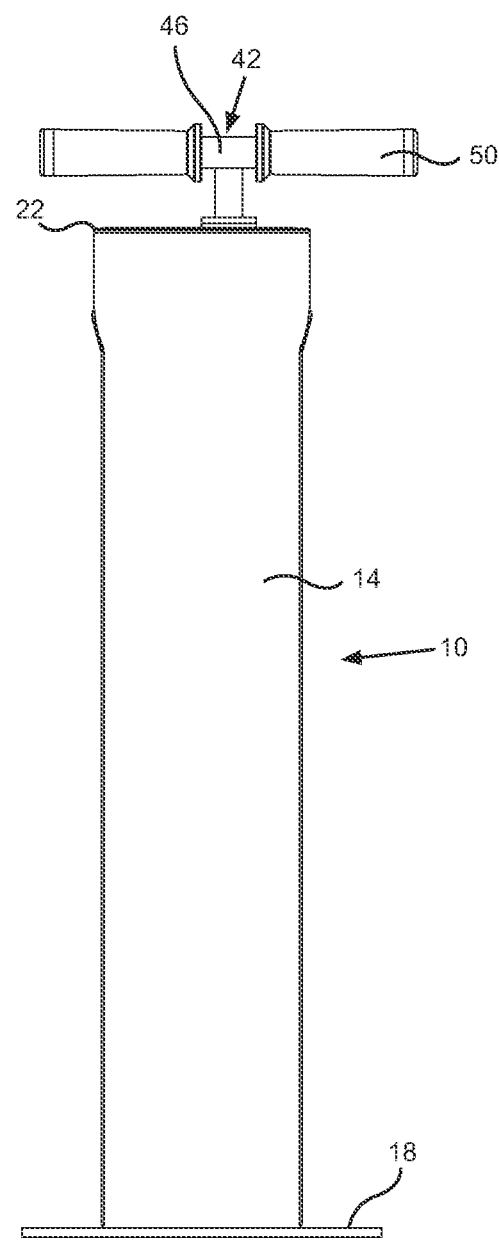
FIG. 4 illustrates a first side view of the pump of FIG. 1.
Figure 5:
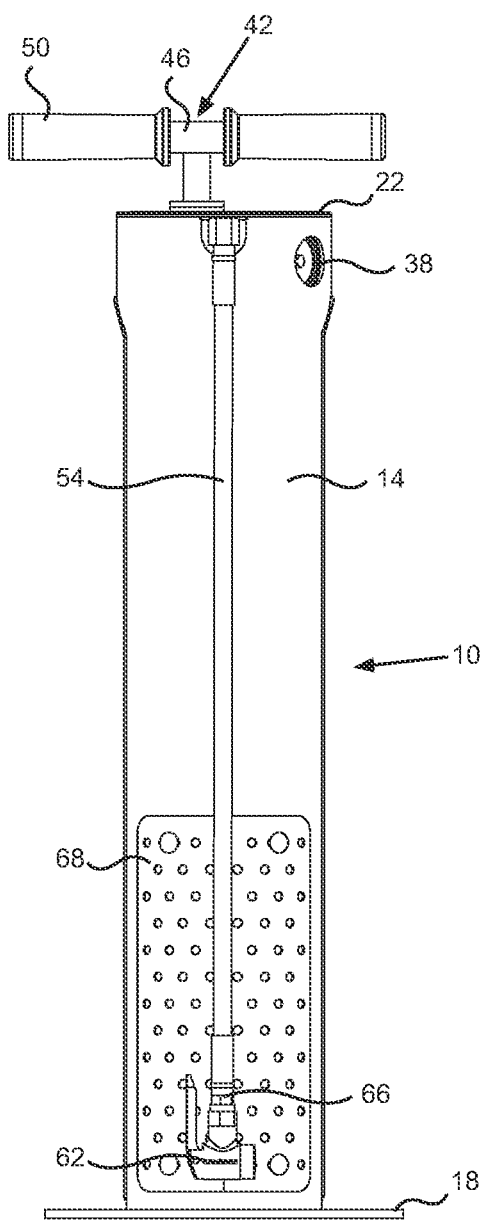
FIG. 5 illustrates a second side view of the pump of FIG. 1.
Figure 6:
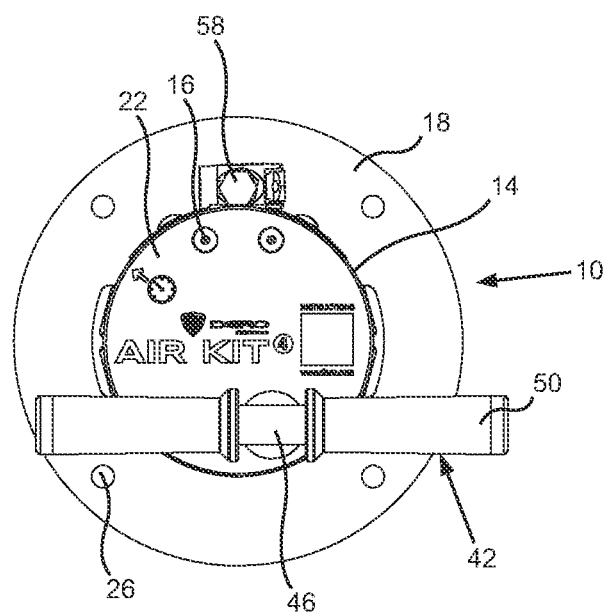
FIG. 6 illustrates a top view of the pump of FIG. 1.
Figure 7:
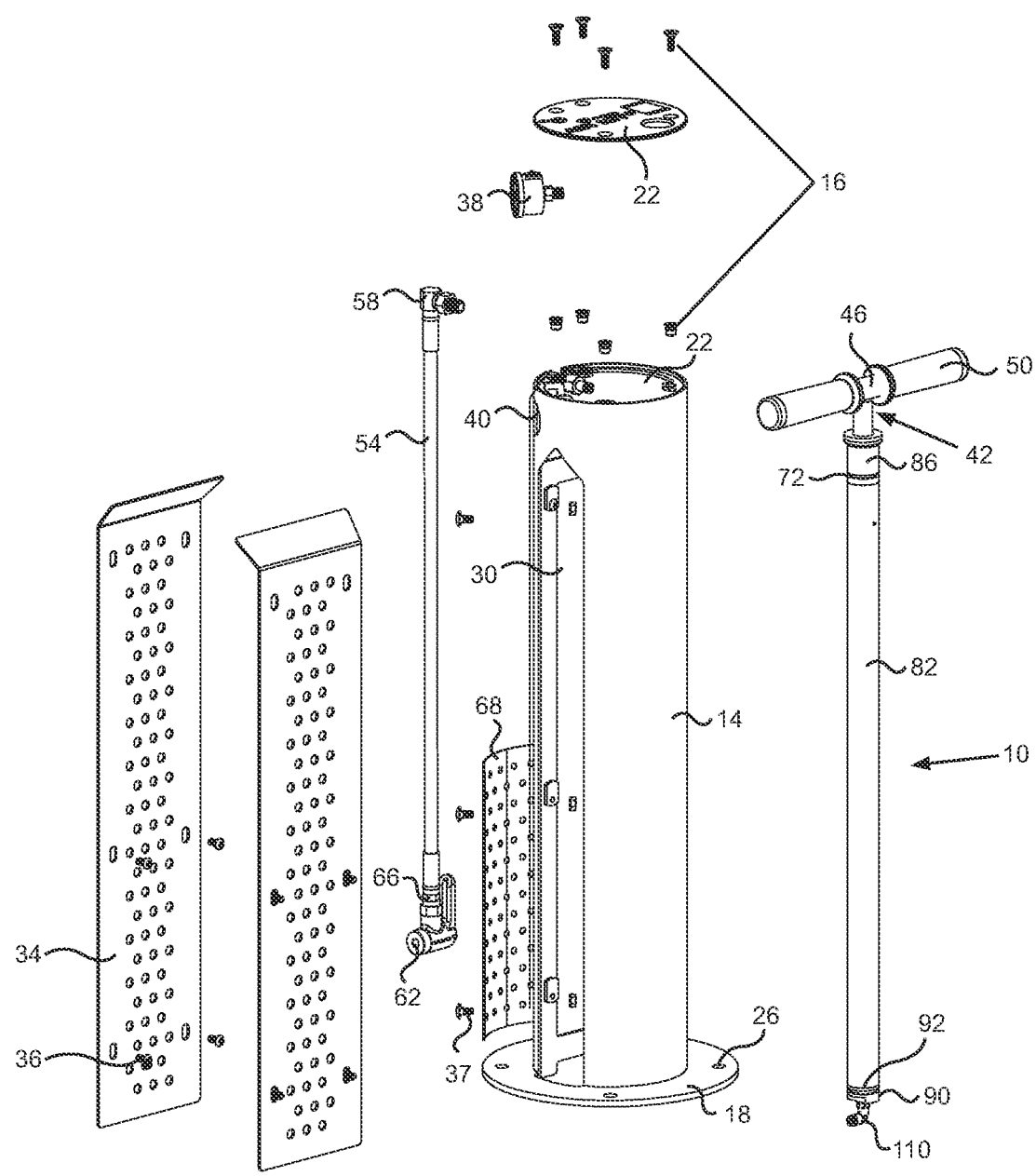
FIG. 7 illustrates a partially exploded view of the pump of FIG. 1.

Before the embodiments of the technology are explained in detail, it is to be understood that the technology is not limited in its application to the details of construction and the arrangement of the components set forth in the following description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

FIGS. 1-7 illustrate a bicycle pump 10 according to an embodiment of the present technology. The pump 10 includes a generally cylindrical body 14 connected to a circular base 18. The base 18 can be a thin plate 18. By way of example only, the body 14 and base 18 may be made of steel, stainless steel, aluminum, or some other metal. By way of example only, the body 14 may have a diameter of about 6 inches. The pump 10 includes a circular top portion 22 detachably mounted on the top of the body 14 by connectors 16 such as tamper resistant bolts. By way of example only, the top portion 22 can be made of powder coated aluminum. The base 18 includes holes 26 that are configured to receive anchors or other connectors to secure the pump 10 to the ground or floor. In particular, the holes 26 may receive wedge anchors to secure the pump to a concrete base.

The body 14 includes a cutout 30 extending there through. The cutout 30 is configured and sized to receive a bicycle tire. The interior of the body 14 includes protective plates 34 on each side of the cutout 30. The plates 34 can be connected to the body 14 by tamper resistant fasteners 36 and are made of, by way of example only, metal, and, in particular, pre-galvanized steel. The cutout 30 can extend through the base 18 such that the bottom of the pump 10 under the cutout 30 is open.

Near the top portion 22, the pump 10 includes an air pressure gauge 38 mounted in a hole 40 in the wall of the body 14. By way of example only, the gauge 38 shows pressure in pounds per square inch. The gauge 38 may alternatively be located in the top portion 22 or elsewhere on the body 14 of the pump 10. The pressure gauge 38 may be filled with oil so that the gauge 38 does not fog up in certain kinds of weather. In particular, the gauge 38 includes a chamber defined by a face and cover, and the chamber is filled at least partly with oil.

With respect to FIGS. 1-7 and 12, the pump 10 includes a handle assembly 42. The handle assembly 42 includes a handle bar 46 having two grips 50 attached thereto. The grips 50 can be slidably attached with adhesive to and removed from the handle bar 46 by maintenance staff. The handle assembly 42 is shown in the "down" position in FIGS. 1-6. By way of example only, the handle bar 46 is made of steel, stainless steel, aluminum, or some other metal, and the grips 50 are made of a hard polymer or rubber material.

Returning to FIGS. 1-7, a flexible hose 54 is connected to a first adapter 58 that extends from the body 14 of the pump 10. A nozzle head 62 is connected to the hose 54 by a second adaptor 66. By way of example only, the hose 54 may be 36 or 48 inches long and made of rubber covered with stainless steel braiding. The adapters 58 and 66 may be "push to connect" or "quick connect" adapters and may be made of brass and/or other kinds of metal and/or plastic. Alternatively, the adapters 58 and 66 could be threadably connected to the hose 54. The nozzle head 62 is configured to be used with a bicycle tire valve to fill the tire with air; however, the nozzle head 62 can also be configured to fill other inflatable objects with air. The pump 10 further includes a protective plate 68 that protects the body 14 from being scratched or damaged by the nozzle head 62 that hangs alongside the body 14. Alternatively, or additionally, the body 14 may include a hook or other retention mechanism by which the nozzle head 62 can be secured or retained. By way of example, the protective plate 68 may be made of metal, and, in particular, pre-galvanized steel. By way of example, the plate 68 can be connected to the body 14 by tamper resistant fasteners 37. Additionally or alternatively, the nozzle head 62 may be made of or include a magnetic material such that it can be magnetically connected to the metal pump body 14 and/or the plate 68.

Figure 8:
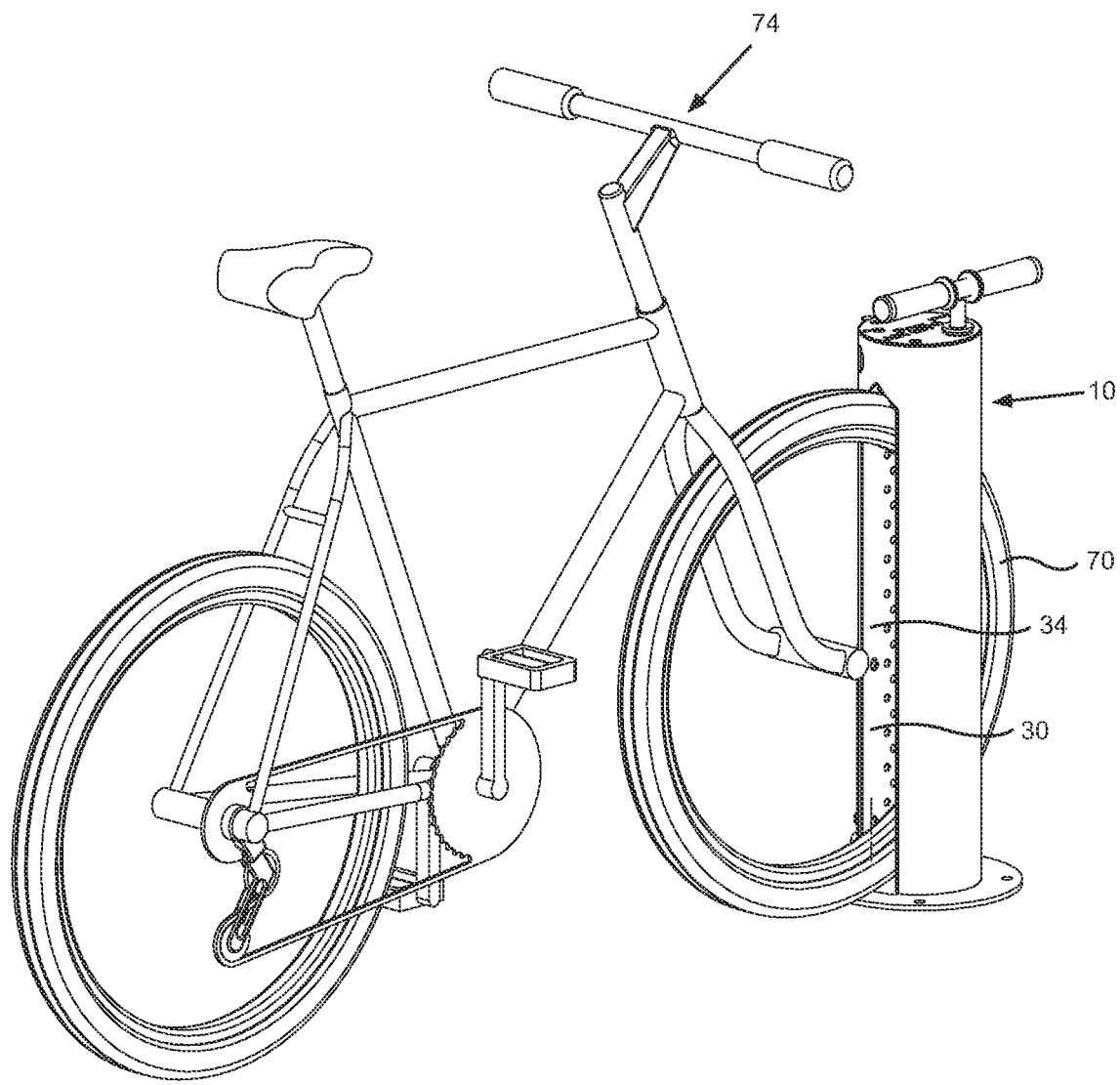
FIG. 8 illustrates an isometric view of the tire of bicycle being positioned in a cutout of the pump of FIG. 1.

FIG. 8 illustrates an isometric view of the tire 70 of a bicycle 74 being positioned in the cutout 30 of the pump 10. With the tire 70 positioned in the cutout 30, the bicycle is held in an upright position without the need of the user to hold the biker upright or use a kickstand to hold the bicycle upright. This frees the user up to use both hands to engage the nozzle head 62 (FIG. 1) with an air valve on the tire 70 and move the handle assembly 42 up and down to pump air into the tire 70 through the valve. The plates 34 in the cutout 30 protect the body 14 of the pump 10 from wear and tear and scratching that can come with bicycle tires being inserted into the cutout 30 over time. The plates 34 can be replaced on the pump 10 after being worn out or damaged.

Figure 9:
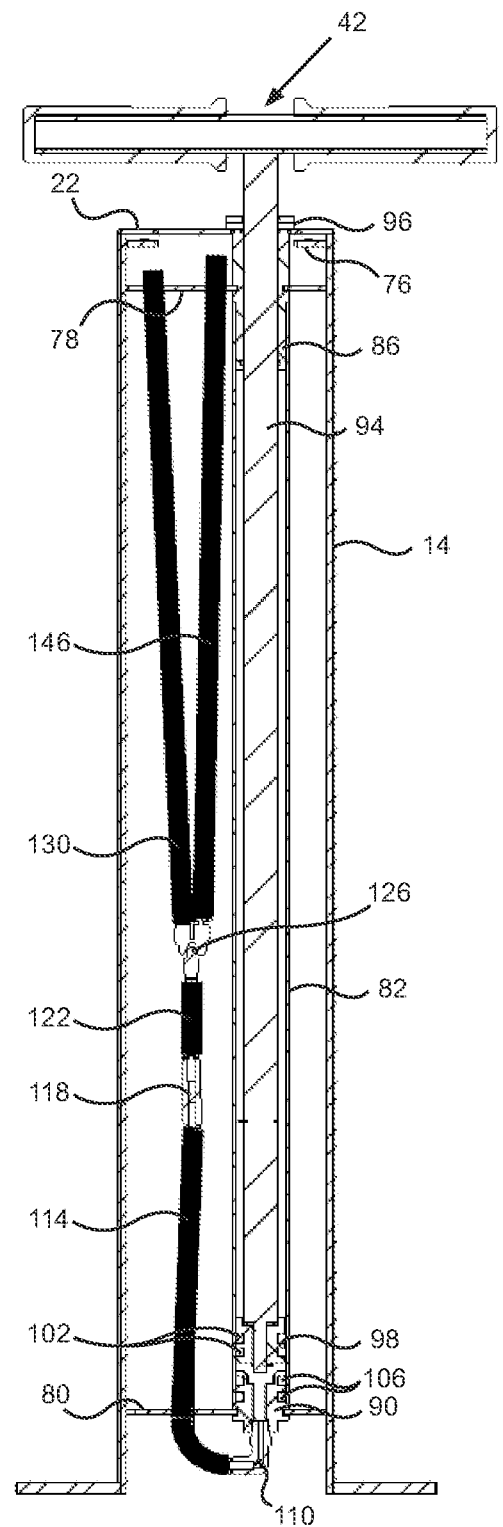
FIG. 9 illustrates a cross-sectional side view of the pump of FIG. 1 taken along lines 5-5 of FIG. 2.
Figure 10:
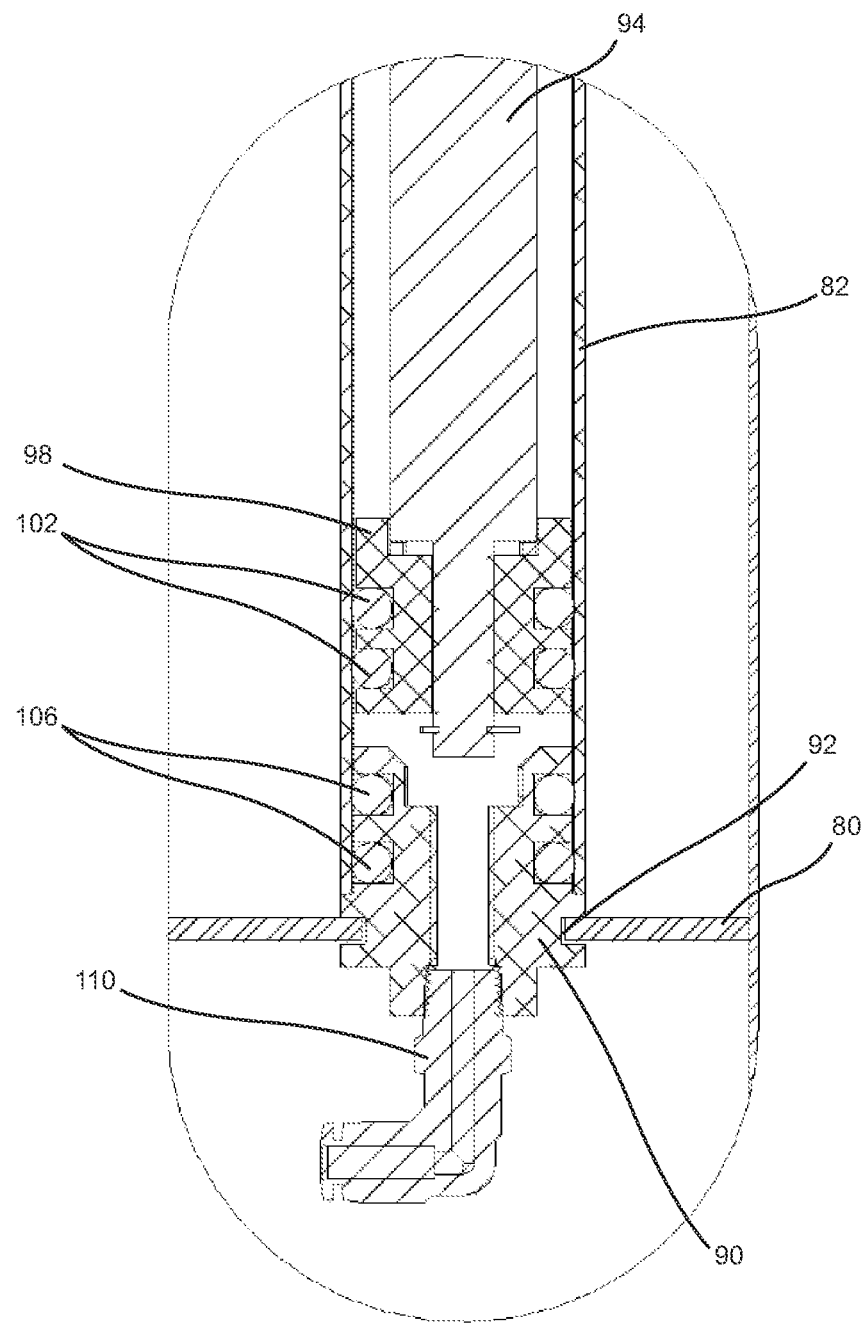
FIG. 10 illustrates blown up view of a portion of the pump shown in FIG. 9.
Figure 11:
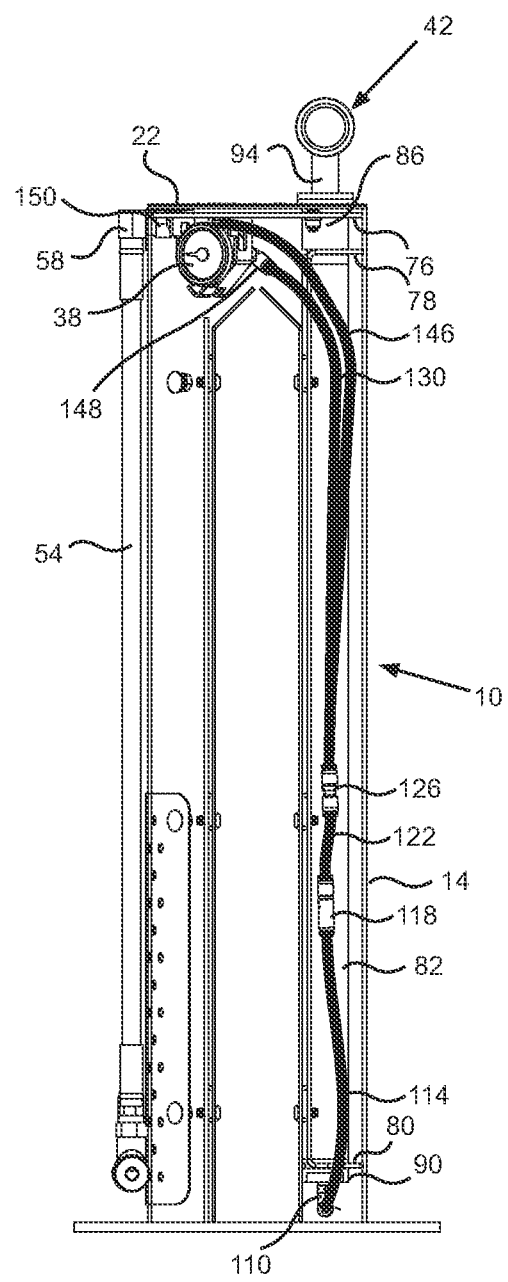
FIG. 11 illustrates a cutaway front view of the pump of FIG. 1
Figure 12:
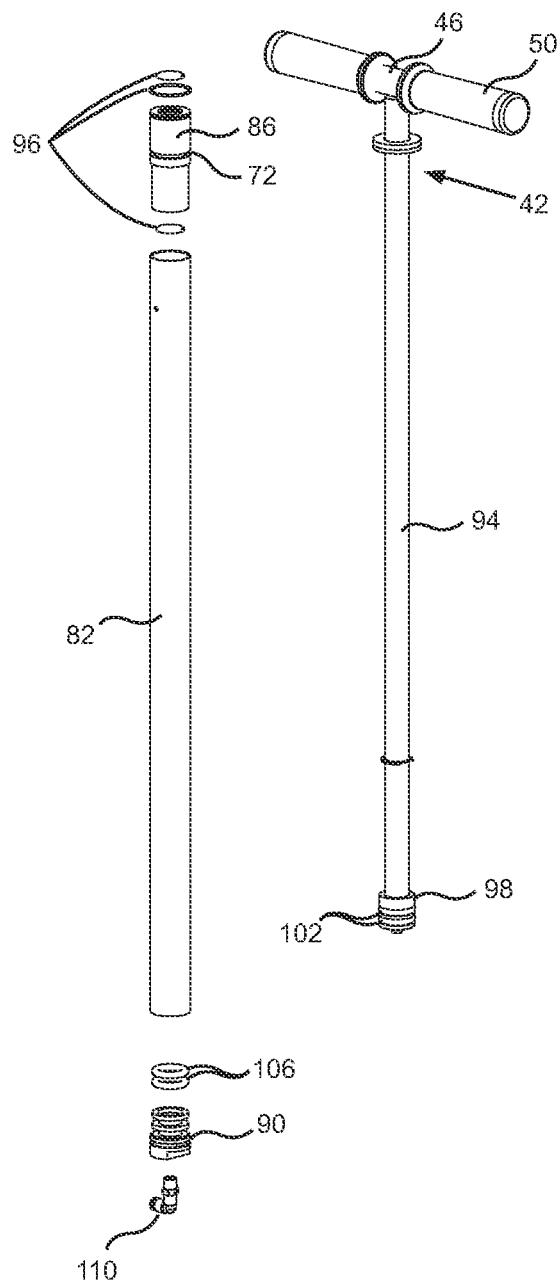
FIG. 12 illustrates a partially exploded view of the handle assembly and pump tube of the pump of FIG. 1.
Figure 13:
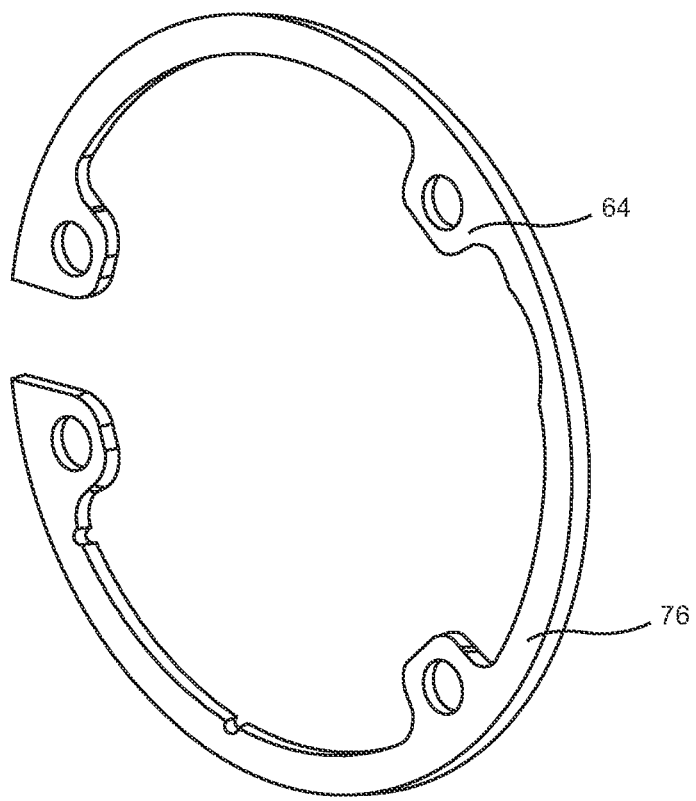
FIG. 13 illustrates an isometric view of an internal plate of the pump.

FIG. 9-11 illustrate sectional views of the pump 10. Proximate the top of the body 14, a ring or plate 76 extends inward from an interior wall of the body 14. With respect to FIG. 13, the ring 76 includes tabs or arms 64 that have holes that are configured to receive the fasteners 16 (FIG. 1) such that the top portion 22 is detachably connected to the ring 76. Returning to FIGS. 9-11, beneath the ring 76 and in the interior of the body 14 is an upper or first support plate 78 that extends from the interior wall of the body 14. Near the bottom of the body 14 is a second or lower support plate 80 that extends from the interior wall of the body 14. A cylindrical pump tube 82 is positioned in the body 14 of the pump 10. The tube 82 includes a bushing 86 detachably connected to the top of the tube 82, and the bushing 86 is positioned in holes in the top portion 22 and the first support plate 78. The bushing 86 includes an annular groove 72 (FIG. 12) that slidably receives a portion of the first support plate 78, thus allowing for the securing of the bushing 86 to the first support plate 78 without the use of tools. A bottom portion 90 of the pump tube 82 is positioned in a hole in the second support plate 80. The bottom portion 90 includes an annular groove 92 that slidably receives a portion of the second support plate 80, thus allowing for the securing of the bottom portion 90 to the second support plate 80 without the use of tools.

With respect to FIGS. 7 and 9-12, the handle assembly 42 is connected to a cylindrical piston rod 94 that slidably extends into the bushing 86 and the pump tube 82. The bushing 86 is sealed with respect to the tube 82 and the rod 94 by gaskets/O-rings 96. A piston head 98 is detachably connected to the bottom of the rod 94. The piston head 98 has two gaskets or O-rings 102 mounted thereto. Silicone grease may be applied to the gaskets 102 once the gaskets 102 are attached to piston head 98. The piston head 98 and the O-rings 102 form an air seal with the interior wall of the pump tube 82. The bottom portion 90 of the pump tube 82 likewise includes a pair of O-rings or gaskets 106 that form an air seal with the interior wall of the pump tube 82. The outer diameter of the rod 94 is less than the inner diameter of the tube 82 so that there is an air gap between the rod 94 and the tube 82 beneath the bushing 86 and above the piston head 98. By way of example only, the rod 94 and tube 82 are made of steel or aluminum or some other metal, the bushing 86 and piston head 98 are made of a hard polymer or plastic material, and the gaskets 102 and 106 are made of a flexible polymer or rubber material. If one of the gaskets 102 or 106 breaks or wears, it does not immediately need to be replaced because the second gasket 102 or 106 maintains a seal with interior wall of the 82 tube. A fitting 110 extends from the bottom portion 90 of the tube 82. By way of example, the fitting 110 is threadably connected to the bottom portion 90.

Returning to FIGS. 9-11, a first air line 114 is connected to and extends from the fitting 110. The air line 114 extends to a check valve 118 that extends from the interior wall of the body 14. A second air line 122 extends from the check valve 118 to a splitter 126 that extends from the interior wall of the body 14. A third air line 130 extends from the splitter 126 to a fitting 148 connected to the pressure gauge 38, which is mounted in the wall of the body 14. A fourth air line 146 extends from the splitter 126 to a fitting 150 that is connected to the first adapter 58 from which the hose 54 extends. The air lines 114, 122, 130, and 146 may be made of rubber, and the fittings 110, 148, and 150, check valve 118, and splitter 126 may be made of steel, brass, or aluminum or some other metal or combination of materials and may all be or include "push to connect" or "quick connect" fittings for easy connection to the air lines.

With reference to FIGS. 7 and 9-12, the pump 10 is assembled as follows. The piston rod 94 with the piston head 98 attached thereto is inserted into the tube 82/bushing 96. The tube 82/bushing 96 is slid through the hole in the top portion 22. The cylindrical body 14 includes the top and bottom support plates 78 and 80, which are secured, such as by welding, to the interior wall of the body 14. The fitting 110 is attached to the tube 82, and the tube 82 is inserted into the body 14 such that the groove 72 in the bushing 96 is slidingly received in the top support plate 78 and the groove 92 in the bottom portion 90 is slidingly received in the bottom support plate 80. The gauge 38 is mounted in the hole 50 in the body 14. By way of example only, the gauge 38 can be threadably connected to the hole 50. Alternatively, the gauge 38 can be mounted to the body 14 in any number of other ways as well. The fitting 148 is connected to the gauge 38.

The third air line 130 is connected to the fitting 148 and the splitter 126, and the fourth air line 146 is connected to the fitting 150 and the splitter 126. The second air line 122 is connected to the check valve 118 and the splitter 126, and the first air line 114 is connected to the fitting 110 and the check valve 118. The hose 54 is connected to the nozzle head 62 by the adapter 66, and the adapter 58 of the hose 54 is connected to the fitting 150 in the body 14 through a hole in the body. The adapter 58 can extend into the body 14 of the pump 10 so that a person cannot reach the adapter 58 to disconnect it from the fitting 150. The top portion 22 is connected to the ring 76 by the fasteners 16. The grips 50 are slid on to the handle bar 46 and held in place on the handle bar 46 by glue or other adhesive. It will be understood that assembly of the pump 10 does not have to follow the exact order of steps described above or include every step described above. The pump 10 can be disassembled for repair or part replacement by reversing some or all of the steps described above.

Once the pump 10 is assembled, the pump 10 can be secured to a ground or floor surface by anchors, such as bolts or wedge anchors, that are inserted through the holes 26 of the base 18 into the surface. By way of example, the pump 10 is secured to a concrete ground or floor surface. By way of example only, the pump 10 can be secured to the ground at a park, bike station, or store or along a trail. Alternatively, the pump 10 can be configured to be connected or attached to a bike stand or bike repair station.

With respect to FIGS. 1-12, the bicycle pump 10 operates as follows. A bicyclist pushes the bicycle tire 70 he or she wishes to fill with air into the cutout 30. By positioning the tire 70 in the cutout 30, the bicycle 74 is held upright. The bicyclist then uses the pump 10 by engaging the nozzle head 62 of the pump 10 with the valve of his or her bicycle tire. Air is released from the bicycle tire valve into the hose 54 of the pump 10. The air travels from the hose 54 into the fourth air line 146 and to the splitter 126. The flow of the air then splits into two different paths. The air travels through the second air line 122 to the check valve 118, which prevents the air from flowing into the first air line 114. The air also travels through the third air line 130 to the pressure gauge 38, at which point the air can no longer travel any further. At this point, the flow of air from the bicycle tire 70 to the pump 10 has reached a point of equilibrium, and the air gauge 38 displays the pressure of the air at that equilibrium point. While the gauge 38 shows the air pressure of a system including the hose 54, the second, third, and fourth air lines, 122, 130, and 146, and the bicycle tire 70, the amount of air in the hose 54 and air lines 122, 130, and 146 is relatively small compared to the amount of air in the bicycle tire 70. Therefore, the gauge 38 provides a reasonably good indication of the air pressure of the bicycle tire 70. If the air pressure shown by the gauge 38 is lower than what is desirable for the bicycle tire 70, the bicyclist uses the pump 10 to fill the tire 70 with more air.

In particular, the bicyclist places at least one hand on the grips 50 of the handle assembly 42 and moves the piston rod 94 up and down. As the piston rod 94 is pulled upward, air is drawn into the tube 82 beneath the piston head 98 through an inlet (not shown) in the tube 82. The bushing 96 is positioned to engage the top of the piston head 98 to prevent the rod 94 from being pulled out of the tube 82. As the piston rod 94 is pushed downward, the piston head 98, which forms a seal with the interior of the tube 82, displaces air out of the tube 82 through the fitting 110 and into the first air line 114.

The displaced air then travels through the first air line 114 and the check valve 118 into the second air line 122. Once the air has passed through the check valve 118, the air cannot go back through the check valve 118 into the first air line 114. Therefore, the air pressure in the second, third, and fourth air lines 122, 130, and 146 increases and, because the air cannot go back through the check valve 118 or through the gauge 38, the air travels through the fourth air line 146 into the hose 54 and into the bicycle tire 70. The air pressure in the bicycle tire 70 increases, as does the pressure in the second, third, and fourth air lines 122, 130, and 146, and this increase in air pressure is shown by the gauge 38. The user continues to move the piston rod 94 up and down in this manner until the gauge 38 shows that the pressure in the system, and thus the tire, has reached a desirable level. The user then disengages the nozzle head 62 from the bicycle tire valve and magnetically re-connects the head 62 to the body 14 of the pump 10.

The various pump embodiments may be configured to be used to inflate any number of other inflatable objects besides bicycle tires and can be used in any number of different locations. The disclosed pump embodiments are made of robust and durable materials and components that provide for greater component lifespans even though the pumps are located outside and are exposed to the elements and repeated use by numerous different bicyclists. Moreover, the pumps are easy to assemble and disassemble, and many of the components are removable. Therefore, if an individual component does wear out or break, the component can easily be removed and replaced without the need to replace the entire pump. For example, the hose, air lines, handle, and air gauge can all easily be removed and replaced by maintenance staff with special tools for tamper resistant hardware. The pumps may also include user friendly features such as an oil-filled pressure gauge that does not fog up and a pump head that can be magnetically connected to the pump body. While the fittings and adapters can be easy-to-use "push to connect" or "quick connect" fittings and adapters, other types of fittings/adapters can be used for connection to the air lines, such as barbed fittings/adapters to which the air lines can be connected.

While various spatial and directional terms, such as top, bottom, lower, mid, lateral, horizontal, vertical, front and the like may used to describe embodiments of the present technology, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present technology. It is understood that the technology disclosed and defined herein extends to all alternative combinations of two or more of the individual features mentioned or evident from the text and/or drawings. All of these different combinations constitute various alternative aspects of the present technology. The embodiments described herein explain the best modes known for practicing the technology and will enable others skilled in the art to utilize the technology. The claims are to be construed to include alternative embodiments to the extent permitted by the prior art.

Various features of the technology are set forth in the following claims.

The invention claimed is:

1. A pump for inflating tires with air, comprising:
   a body having a base and a cutout defined by opposite side walls that extend up from the base and that are connected by a top wall and configured to receive a tire of a bicycle such that the tire is positioned between the side walls and under the top wall and further including at least one plate mounted to an outside surface of the body inside the cutout, wherein the base is configured to be anchored to the ground;
   a handle assembly including a piston rod and a handle bar;
   a tube positioned in the body and secured to an upper plate and a lower plate in the body, wherein the tube includes a bottom portion that extends through the lower plate, the tube slidably receiving the piston rod and being connected to an air line; and
   a hose connected to the air line and extending from the body, the hose having a head configured to engage a nozzle of the tire;
   wherein, when the piston rod is moved downward within the tube, air is displaced from the tube and through the air line to the hose such that the head dispenses air.

2. The pump of claim 1, further including a top portion that is detachably connected by a fastener to a tab located in the body.

3. The pump of claim 2, wherein the tab is part of a ring connected to an interior surface of the body and located above the upper plate.

4. The pump of claim 1, wherein the base includes holes that are configured to receive connectors to anchor the pump to the ground.

5. The pump of claim 1, wherein the bottom portion of the tube includes a gasket that forms an air seal with an interior wall of the tube, and wherein the tube has a first annular groove and the bottom portion includes a second annular groove and the first annular groove receives a portion of the upper plate and the second annular groove receives a portion of the lower plate.

6. The pump of claim 1, wherein the body has a cylindrical exterior and the pump further includes a curved protective plate connected by fasteners to the exterior of the body, wherein the plate is configured to engage the nozzle head.

7. The pump of claim 1, wherein the air line comprises:
   a first air line that is connected at a first end to a first fitting extending from the tube and located entirely below the lower plate and that is connected at a second end to a check valve;
   a second air line that is connected at a first end to the check valve and that is connected at a second end to a splitter;
   a third air line that is connected at a first end to the splitter and that is connected at a second end to a second fitting connected to a pressure gauge; and
   a fourth air line that is connected at a first end to the splitter and that is connected at a second end to a third fitting connected to the hose.

8. The pump of claim 1, wherein the cutout extends through the base.

9. A pump for inflating tires with air, comprising:
   a body having a base and a top portion and a cutout defined by opposite side walls that extend up from the base and that are connected by a top wall and configured to receive a tire of a bicycle such that the tire is positioned between the side walls and under the top wall and further including at least one plate mounted to an outside surface of the body inside the cutout, wherein the base is configured to be anchored to the ground and the top portion is detachably connected by a fastener to a tab positioned in the body;
   a handle assembly including a piston rod and a handle bar;
   a tube positioned in the body and secured to an upper plate and a lower plate in the body, wherein the tube includes a bottom portion that extends through the lower plate, the tube slidably receiving the piston rod and being connected to an air line; and a hose connected to the air line and extending from the body, the hose having a head configured to engage a nozzle of the tire;

wherein, when the piston rod is moved downward within the tube, air is displaced from the tube and through the air line to the hose such that the head dispenses air.

10. The pump of claim 9, wherein the tab is part of a ring connected to an interior surface of the body and located above the upper plate.

11. The pump of claim 9, wherein the bottom portion of the tube includes a gasket that forms an air seal with an interior wall of the tube, and wherein the tube has a first annular groove and the bottom portion includes a second annular groove and the first annular groove receives a portion of the upper plate and the second annular groove receives a portion of the lower plate.

12. The pump of claim 9, wherein the body has a cylindrical exterior and the pump further includes a curved protective plate connected by fasteners to the exterior of the body, wherein the plate is configured to engage the nozzle head.

13. The pump of claim 9, wherein the air line comprises:
a first air line that is connected at a first end to a first fitting extending from the tube and located entirely below the lower plate and that is connected at a second end to a check valve;
a second air line that is connected at a first end to the check valve and that is connected at a second end to a splitter;
a third air line that is connected at a first end to the splitter and that is connected at a second end to a second fitting connected to a pressure gauge; and
a fourth air line that is connected at a first end to the splitter and that is connected at a second end to a third fitting connected to the hose.

14. The pump of claim 9, wherein the piston rod includes a piston head on which is mounted two flexible gaskets that each form a seal with an interior wall of the tube.

15. The pump of claim 9, wherein the cutout extends through the base.

16. A pump for inflating tires with air, comprising:
a body having a base and a cutout defined by opposite side walls that extend up from the base and that are connected by a top wall and configured to receive a tire of a bicycle such that the tire is positioned between the side walls and under the top wall and further including at least one plate connected by a fastener to an outside surface of the body inside the cutout, wherein the base is configured to be anchored to the ground;
a handle assembly including a piston rod and a handle bar;
a tube positioned in the body and secured to an upper plate and a lower plate in the body, wherein the tube includes a bottom portion that extends through the lower plate, the tube slidably receiving the piston rod and being connected to an air line; and
a hose connected to the air line and extending from the body, the hose having a head configured to engage a nozzle of the tire;
wherein, when the piston rod is moved downward within the tube, air is displaced from the tube and through the air line to the hose such that the head dispenses air.

17. The pump of claim 16, further including a top portion that is detachably connected by a fastener to a tab located in the body.

18. The pump of claim 17, wherein the tab is part of a ring connected to an interior surface of the body and located above the upper plate.

19. The pump of claim 16, wherein the bottom portion of the tube includes a gasket that forms an air seal with an interior wall of the tube, and wherein the tube has a first annular groove and the bottom portion includes a second annular groove and the first annular groove receives a portion of the upper plate and the second annular groove receives a portion of the lower plate.

20. The pump of claim 16, wherein the body has a cylindrical exterior and the pump further includes a curved protective plate connected by fasteners to the exterior of the body, wherein the plate is configured to engage the nozzle head.

* * * * *